(12) United States Patent
Jiang et al.

(10) Patent No.: US 10,211,452 B2
(45) Date of Patent: Feb. 19, 2019

(54) LITHIUM ION BATTERY COMPONENTS

(71) Applicant: GM GLOBAL TECHNOLOGY OPERATIONS LLC, Detroit, MI (US)

(72) Inventors: Meng Jiang, Rochester Hills, MI (US); Bob R. Powell, Jr., Birmingham, MI (US); Jung-Hyun Kim, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 375 days.

(21) Appl. No.: 14/973,356

(22) Filed: Dec. 17, 2015

(65) Prior Publication Data

US 2017/0179469 A1   Jun. 22, 2017

(51) Int. Cl.
*H01M 4/42* (2006.01)
*H01M 4/36* (2006.01)
*H01M 4/38* (2006.01)
*H01M 4/44* (2006.01)
*H01M 4/58* (2010.01)
*H01M 10/0525* (2010.01)
*H01M 4/04* (2006.01)
*H01M 4/136* (2010.01)

(52) U.S. Cl.
CPC ......... *H01M 4/364* (2013.01); *H01M 4/0404* (2013.01); *H01M 4/136* (2013.01); *H01M 4/382* (2013.01); *H01M 4/42* (2013.01); *H01M 4/44* (2013.01); *H01M 4/581* (2013.01); *H01M 4/5805* (2013.01); *H01M 4/5815* (2013.01); *H01M 10/0525* (2013.01); *H01M 2220/20* (2013.01); *H01M 2220/30* (2013.01); *Y02E 60/122* (2013.01)

(58) Field of Classification Search
CPC ...... H01M 4/36; H01M 10/0525; H01M 4/38; H01M 4/42; H01M 4/44; H01M 4/58; H01M 4/0404; H01M 4/136; H01M 4/5805; H01M 4/364; H01M 4/382; H01M 4/581; H01M 4/5815; H01M 2220/20; H01M 2220/30; Y02E 60/122

See application file for complete search history.

(56) References Cited

U.S. PATENT DOCUMENTS

| | | | |
|---|---|---|---|
| 7,736,805 B2 | 6/2010 | Nazri et al. | |
| 8,067,116 B2 | 11/2011 | Kim et al. | |
| 8,101,152 B1 | 1/2012 | Halalay et al. | |
| 8,399,138 B2 | 3/2013 | Timmons | |
| 8,420,259 B2 | 4/2013 | Xiao et al. | |
| 8,440,350 B1 | 5/2013 | Verbrugge et al. | |
| 8,642,201 B2 | 2/2014 | Cheng et al. | |
| 8,658,295 B2 | 2/2014 | Cheng et al. | |
| 8,679,680 B2 | 3/2014 | Vanimisetti et al. | |
| 8,828,481 B2 | 9/2014 | Burton et al. | |
| 8,835,056 B2 | 9/2014 | Xiao et al. | |
| 8,999,584 B2 | 4/2015 | Jiang et al. | |
| 9,012,075 B2 | 4/2015 | Verbrugge et al. | |
| 9,093,705 B2 | 7/2015 | Xiao et al. | |
| 9,142,830 B2 | 9/2015 | Xiao et al. | |
| 9,153,819 B2 | 10/2015 | Huang et al. | |
| 9,356,281 B2 | 5/2016 | Verbrugge et al. | |
| 9,362,551 B2 | 6/2016 | Sachdev et al. | |
| 9,362,552 B2 | 6/2016 | Sohn et al. | |
| 9,583,767 B2 | 2/2017 | Verbrugge et al. | |
| 2006/0088767 A1* | 4/2006 | Li | H01M 4/13 429/231.95 |
| 2006/0263689 A1* | 11/2006 | Ishihara | C22C 13/00 429/221 |
| 2009/0286156 A1* | 11/2009 | Gillot | H01M 4/136 429/207 |
| 2012/0100403 A1 | 4/2012 | Wang et al. | |
| 2012/0229096 A1 | 9/2012 | Nazri | |
| 2012/0328927 A1 | 12/2012 | Timmons et al. | |
| 2013/0099159 A1 | 4/2013 | Halalay et al. | |
| 2013/0190629 A1 | 7/2013 | Umeda et al. | |
| 2014/0272584 A1* | 9/2014 | Jiang | H01M 4/58 429/220 |
| 2017/0098817 A1 | 4/2017 | Yu et al. | |

FOREIGN PATENT DOCUMENTS

| | | | |
|---|---|---|---|
| CN | 106898810 A | 6/2017 | |
| DE | 102016123898 A1 | 6/2017 | |
| WO | WO 2014064361 | * | 1/2014 |

OTHER PUBLICATIONS

Gillot at all. Chem. Mater. 2005, 17, 3627-3635 (Year: 2005).*
Crosnier at all. Chem. Mater. 2003, 15, 4890-4892 (Year: 2003).*
Ishihara Abstract NPL.*
WO 2014064361 MT.*
Doublet et al. "The LixVPn4 Ternary Phases (Pn ) P, As): Rigid Networks for Lithium Intercalation/Deintercalation", Chem. Mater. 2002, 14, 4126-4133 (Year: 2002).*
Kim, et al. "Highly Reversible Li-Ion Intercalating MoP2 Nanoparticle Cluster Anode for Lithium Rechargeable Batteries"; ECS; 2009; pp. A89-A94.
Gosselink, "Study of Transition Metal Phosphides as Anode Materials for Lithium-ion Batteries; Phase Transitions and the Role of the Anionic Network"; Thesis; 2006; pp. 1-220.
Xiao et al., "Vertically aligned graphene electrode for lithium ion battery with high rate capability", Electrochemistry Communications, 13, 2011, 209-212.

* cited by examiner

*Primary Examiner* — Alexander Usyatinsky
(74) *Attorney, Agent, or Firm* — Harness, Dickey & Pierce, P.L.C.

(57) ABSTRACT

A lithium ion battery component includes a support selected from the group consisting of a current collector, a negative electrode, and a porous polymer separator. A lithium donor is present i) as an additive with a non-lithium active material in a negative electrode on the current collector, or ii) as a coating on at least a portion of the negative electrode, or iii) as a coating on at least a portion of the porous polymer separator. The lithium donor has a formula selected from the group consisting of $Li_{8-y}M_yP_4$, wherein M is Fe, V, or Mn and wherein y ranges from 1 to 4; $Li_{10-y}Ti_yP_4$, wherein y ranges from 1 to 2; $Li_xP$, wherein $0<x\le3$; and $Li_2CuP$.

14 Claims, 2 Drawing Sheets

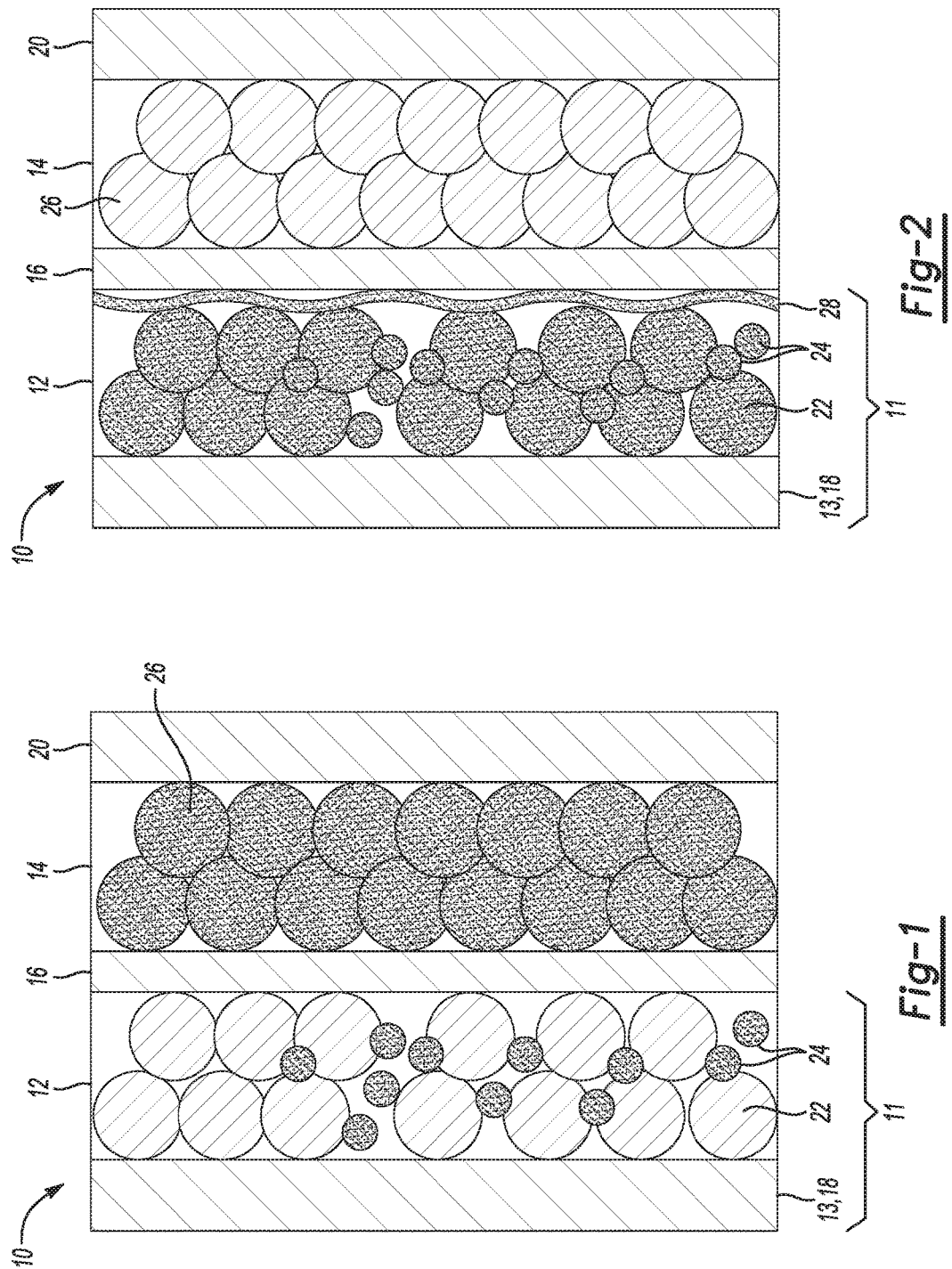

LITHIUM ION BATTERY COMPONENTS

BACKGROUND

Secondary, or rechargeable, lithium ion batteries are often used in many stationary and portable devices, such as those encountered in the consumer electronic, automobile, and aerospace industries. The lithium ion class of batteries has gained popularity for various reasons, including a relatively high energy density, a general nonappearance of any memory effect when compared with other kinds of rechargeable batteries, a relatively low internal resistance, a low self-discharge rate when not in use, and an ability to be formed into a wide variety of shapes (e.g., prismatic) and sizes so as to efficiently fill available space in electric vehicles, cellular phones, and other electronic devices. In addition, the ability of lithium ion batteries to undergo repeated power cycling over their useful lifetimes makes them an attractive and dependable power source.

SUMMARY

A lithium ion battery component includes a support selected from the group consisting of a current collector, a negative electrode, and a porous polymer separator. A lithium donor is present i) as an additive with a non-lithium active material in a negative electrode on the current collector, or ii) as a coating on at least a portion of the negative electrode, or iii) as a coating on at least a portion of the porous polymer separator. The lithium donor has a formula selected from the group consisting of $Li_{8-y}M_yP_4$, wherein M is Fe, V, or Mn and wherein y ranges from 1 to 4; $Li_{10-y}Ti_yP_4$, wherein y ranges from 1 to 2; $Li_xP$, wherein $0 < x \leq 3$; and $Li_2CuP$.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a schematic diagram of an example of a lithium ion battery including an example of a lithium ion battery component in which a lithium donor is included in the negative electrode;

FIG. 2 is a schematic diagram of the example lithium ion battery shown in FIG. 1 after the first charging operation.

DETAILED DESCRIPTION

Figure 3:
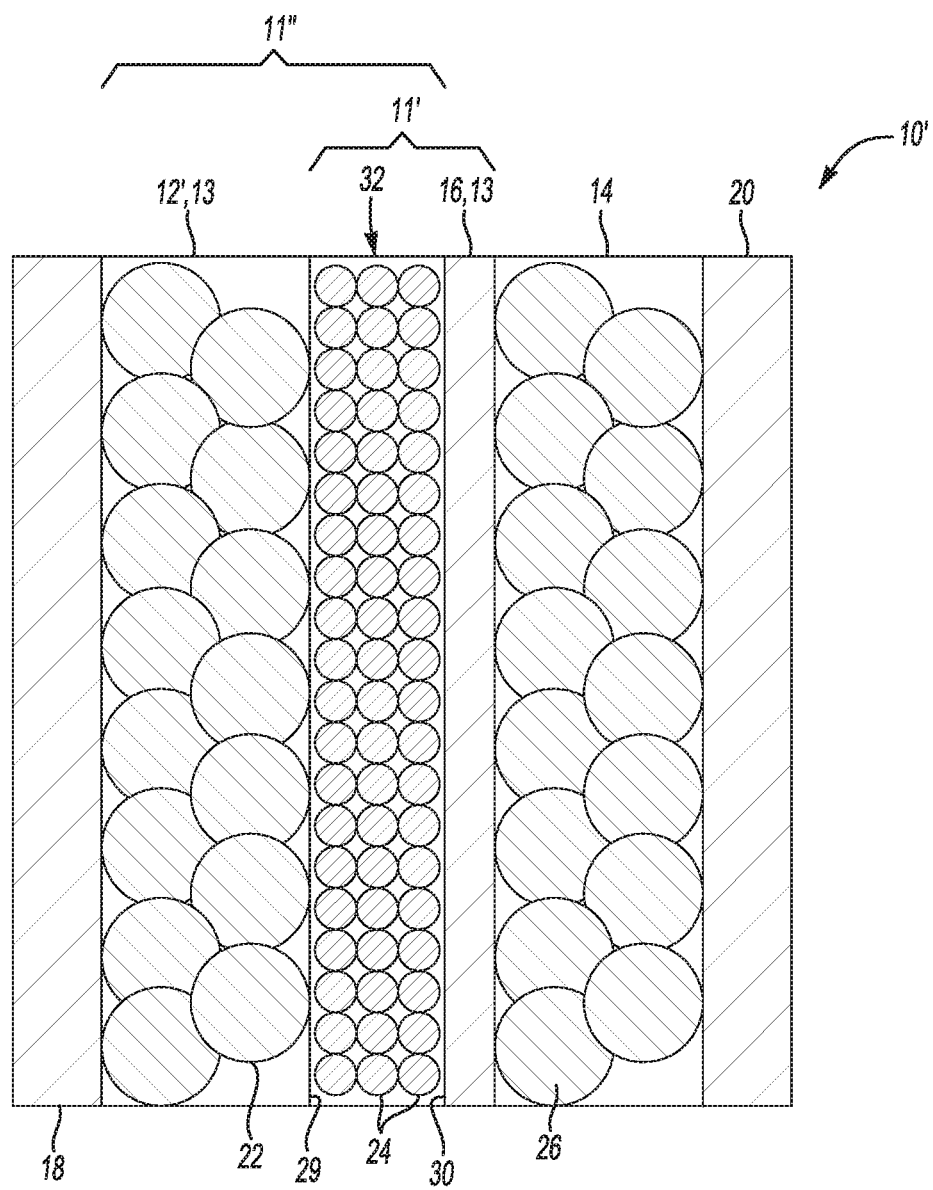
FIG. 3 is a schematic diagram of another example of a lithium ion battery including other examples of lithium ion battery components in which the lithium donor is included in a coating on the negative electrode or on the porous polymer separator.

Nanostructured negative electrodes of lithium ion batteries often have a large surface area resulting in a high irreversible capacity loss (IRCL) due, in part, to the formation of a solid electrode interphase (SEI) or the formation of irreversible phase(s), either of which consume otherwise active lithium. Several approaches have been attempted in order to compensate for lithium loss in the SEI.

As one example approach, extra capacity may be incorporated onto the positive electrode of the battery. However, this approach reduces the energy density of the battery and potentially leads to undesirable lithium plating on the negative electrode.

As another approach, pre-lithiation of a component of the battery may be used. Pre-lithiation provides additional lithium ions to the component. One example of pre-lithiation involves spraying stabilized lithium ion particles onto electrodes of the battery. However, due to particle size mismatch between lithium ion particles and typical electrode materials, voids of uncoated electrode may exist, which can lead to non-homogeneity of the electrode. Electrode non-homogeneity can be disadvantageous for battery performance. Furthermore, thermal energy is formed during this pre-lithiation process, which increases the complexity and cost of the battery during mass production. Specifically, the spray process requires dry ambient conditions due to the sensitivity of lithium ions to water and/or oxygen.

Still other pre-lithiation approaches involve applying a thin coat of lithium on the separator of the battery by thermal evaporation or a sputtering process. These processes are costly and also generate a large amount of thermal energy due, in part, to the direct contact between lithium metal and the electrode, especially in batteries with large cells (e.g., >2 Ah cells).

Yet another pre-lithiation approach involves the pre-lithiation of an electrode by electrochemical deposition. However, this approach may utilize excessive amounts of electrolyte.

Examples of the lithium ion battery component disclosed herein incorporate a lithium donor either into the negative electrode or onto the surface of a porous polymer separator. The lithium donor is an air-stable, high lithium content alloy/compound of phosphorus that enables pre-lithiation of the lithium ion battery. The pre-lithiation of the battery with the lithium donor can also improve the battery's capacity retention, energy density, and abuse tolerance, which lead to an extended battery life cycle and/or driving range (e.g., for hybrid or electric vehicles). The lithium donor is also suitable for mass production.

The lithium donor disclosed herein has a formula selected from the group consisting of $Li_{8-y}M_yP_4$, wherein M is Fe, V, or Mn and wherein y ranges from 1 to 4; $Li_{10-y}Ti_yP_4$, wherein y ranges from 1 to 2; $Li_xP$, wherein $0 < x \leq 3$; and $Li_2CuP$. Some specific examples of the lithium donor include $Li_7MnP_4$ (i.e., $Li_{8-y}M_yP_4$, wherein M is Mn and y is 1), $Li_{5.5}Mn_{2.5}P_4$ (i.e., $Li_{8-y}M_yP_4$, wherein M is Mn and y is 2.5), $Li_7VP_4$ (i.e., $Li_{8-y}M_yP_4$, wherein M is V and y is 1), $Li_3P$ (i.e., $Li_xP$, wherein x=3), and $Li_9TiP_4$ (i.e., $Li_{10-y}Ti_yP_4$, wherein y is 1). Several of these materials have been proposed as negative material active materials. However, it has been found that while these materials may deliver high capacity (e.g., $Li_3P$ that can deliver a theoretical capacity of 2596 mAh/g), the life cycle of the negative electrode including these materials is negligible. For example, $Li_7MnP_4$ can deliver 1000 mAh/g during the first cycle at C/20 rate, but the capacity quickly decreases to 420 mAh/g at the $4^{th}$ cycle. It has been found that the material is not suitable for a negative electrode active material due to the fast capacity fading, but that its first cycle capacity may be used for the pre-lithiation process. In the examples disclosed herein, the lithium donor is incorporated as an additive in the negative electrode or is positioned on the surface of the negative electrode or the porous polymer separator so that it delivers lithium to the negative electrode during formation cycling.

The particle size (i.e., diameter of a spherical particle and average diameter of a non-spherical particle) of the lithium donor may be tailored during the chemical synthesis and/or mechanical engineering thereof. In the examples disclosed herein, the lithium donor particle size may be tailored in order to maximize the amount of lithium that is added to the battery with a minimum impact on the overall battery volume. In an example, the lithium donor particle size ranges from about 10 nm to about 50 µm.

As previously mentioned, the lithium donor is incorporated as an additive in the negative electrode or is positioned on the surface of the negative electrode or the porous polymer separator. FIGS. 1 and 2 illustrate a lithium ion battery component with the lithium donor incorporated as an additive in the negative electrode, and FIG. 3 illustrates a lithium ion battery component with the lithium donor positioned as a coating on the surface of the negative electrode or the surface of the porous polymer separator.

Referring specifically to FIG. 1, the lithium ion battery component 11 includes a support 13 and a negative electrode 12 on the support 13. In this example, the support 13 is a negative-side current collector 18 that is in electrical communication with the negative electrode 12. The negative-side current collector 18 may be formed of an electrically conductive material, such as a copper foil or another metal that can function as the negative terminal of the lithium ion battery 10.

The negative electrode 12 includes a non-lithium active material 22 and the lithium donor 24. Examples of the non-lithium active material 22 include i) a carbon-based material; ii) silicon (Si), germanium (Ge), tin (Sn), lead (Pb), antimony (Sb), bismuth (Bi), zinc (Zn), aluminum (Al), or cadmium (Cd); iii) alloys or intermetallic compounds of Si, Ge, Sn, Pb, Sb, Bi, Zn, Al, Ti, iron (Fe), manganese (Mn), or Cd with other elements (wherein the alloys or compounds are stoichiometric or non-stoichiometric); iv) oxides, carbides, nitrides, sulfides, phosphides, selenides, or tellurides of Si, Ge, Sn, Pb, Sb, Bi, Zn, Al, Fe, Ti, Mn, Co, or Cd, or mixtures or composites thereof; and v) any combination of i, ii, iii, and/or iv. Some specific examples of suitable carbon-based materials include carbon, meso-phase carbon, soft carbon, hard carbon, carbon black, activated carbon, natural graphite, artificial graphite, pyrolytic graphite, exfoliated graphite flakes, worm-like graphite, carbon nanofibers, carbon nanotubes, graphene, graphene oxide, graphene fluoride, carbon fibers, graphite fibers, graphite whiskers, and coke. Any of the examples of the lithium donor 24 previously described herein may be used in the negative electrode 12.

In an example, the non-lithium active material 22 may be present in an amount ranging from greater than 0 wt % to about 98 wt % of a total wt % of the negative electrode 12, and the lithium donor 24 may be present in an amount ranging from greater than 0 wt % to about 50 wt % of a total wt % of the negative electrode 12. The remainder of the negative electrode 12 may be a binder (from 0 wt % to about 20 wt %) and/or a conductive filler (from 0 wt % to about 20 wt %), and/or various other functional additives (e.g., viscosity modifying agents, etc.).

The binder may be used to structurally hold the non-lithium active material 22 and the lithium donor 24 together. Examples of the binder include polyvinylidene fluoride (PVdF), polyethylene oxide (PEO), ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, lithium polyacrylate (LiPAA), cross-linked lithiated polyacrylate, polyimide, or any other suitable binder material. Other suitable binders may include polyvinyl alcohol (PVA), sodium alginate, or other water-soluble binders.

The conductive filler may be a conductive carbon material. The conductive carbon material may be a high surface area carbon, such as acetylene black (e.g., SUPER P® conductive carbon black from TIMCAL). The conductive filler may be included to ensure electron conduction between the active material 22 and the lithium donor 24 and the negative-side current collector 18.

Prior to assembly of the lithium ion battery 10, the negative electrode 12 may be formed according to an example of the method disclosed herein. The negative electrode 12 may be formed by mixing the lithium donor 24 in a powdered form with the non-lithium active material 22 in a powdered form. The powder mixture may include greater than 0 wt % to about 98 wt % of the non-lithium active material 22 and greater than 0 wt % to about 50 wt % of the lithium donor 24. The powder mixture may also include the binder, conductive filler, and/or other additives. The powder mixture may be mixed into a slurry with a non-aqueous liquid. The non-aqueous liquid may be NMP (N-Methyl-2-pyrrolidone), acetone, or the like. Because the lithium donor 24 is not pure lithium or a lithium foil, there is no direct contact between lithium metal and the non-lithium active material 22, and thermal energy generated during the slurrying process is minimized. In this example of the method, the slurry is coated (e.g., doctor blade coated, slot die coated, etc.) onto one side of the support 13/negative-side current collector 18, and is dried to form the negative electrode 12 thereon. In the example shown in FIG. 1, the one side of the support 13/negative-side current collector 18 that has the negative electrode 12 formed thereon is the side that faces the porous polymer separator 16. It is understood that the slurry may be coated on the opposed second side of the support/current collector 18, or on both sides, as desired. By forming the negative electrode 12 according to this method, the negative electrode is pre-lithiated. The negative electrode 12 includes the lithium donor 24 admixed with the non-lithium active material 22.

Referring back to FIG. 1, the fully assembled the lithium ion battery 10 also includes a positive electrode 14 and a porous polymer separator 16 positioned between the positive and negative electrodes 14, 12.

The positive electrode 14 includes an active material 26, which may be a non-lithiated species or a lithiated species. Examples of the non-lithiated species for the active material 26 include a non-lithiated $V_2O_5$ or $MnO_2$. Still other suitable non-lithiated species for the active material 26 include graphene-based materials (e.g., graphene, graphene oxide, or graphene fluoride sheets having high specific surface areas to capture lithium ions during cell discharge), and a carbonaceous material having a high specific surface area. The aforementioned graphene-based material and/or the carbonaceous material may also be incorporated with another active material 26 to act as a conductive additive, as desired.

Examples of the lithiated species for the active material 26 include spinel lithium manganese oxide ($LiMn_2O_4$), lithium cobalt oxide ($LiCoO_2$), a manganese-nickel oxide spinel [$Li(Mn_{1.5}Ni_{0.5})O_2$], a layered nickel-manganese-cobalt oxide (having a general formula of $xLi_2MnO_3 \cdot (1-x)LiMO_2$, where M is composed of any ratio of Ni, Mn and/or Co). A specific example of the layered nickel-manganese-cobalt oxide includes ($xLi_2MnO_3 \cdot (1-x)Li(Ni_{1/3}Mn_{1/3}Co_{1/3})O_2$). Other suitable examples of the lithiated species for the active material 26 include $Li(Ni_{1/3}Mn_{1/3}Co_{1/3})O_2$, $Li_{x+y}Mn_{2-y}O_4$(LMO, $0<x<1$ and $0<y<0.1$), or a lithium iron polyanion oxide, such as lithium iron phosphate (LiFePO$_4$) or lithium iron fluorophosphate (Li$_2$FePO$_4$F), or a lithium rich layer-structure. Still other lithiated species may also be utilized for the active material 26, such as $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg) (an example of which includes $LiMn_{1.5}Ni_{0.5}O_4$ or LiMNO$_4$), stabilized lithium manganese oxide spinel ($Li_xMn_{2-y}M_yO_4$, where M is composed of any ratio of Al, Ti, Cr, Ni, Co, and/or Mg), lithium nickel cobalt aluminum oxide (e.g., $LiNi_{0.8}Co_{0.15}Al_{0.05}O_2$ or NCA), aluminum stabilized lithium manganese oxide spinel (e.g., $Li_xAl_{0.05}Mn_{0.95}O_2$), lithium vanadium oxide (LiV$_2$O$_5$), Li$_4$SiO$_4$, Li$_2$MSiO$_4$ (where M is composed of any ratio of Co, Fe, and/or Mn), and any other high energy nickel-manganese-cobalt material (HE-NMC, NMC or LiNiMnCoO$_2$). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal-based active material to stabilize the crystal structure. For example, any O atom may be substituted with an F atom.

The positive electrode 14 may also include any of the binders and/or conductive fillers and/or other additives previously described. In an example, the positive electrode 14 may include up to 98% by total weight (i.e., 98 wt %) of the active material 26, from about 0 wt % to about 20 wt % of the conductive filler, from about 0 wt % to about 20 wt % of the binder and from about 0 wt % to about 20 wt % of other additives.

As shown in FIG. 1, the positive electrode 14 is in electrical communication with a positive-side current collector 20. The positive-side current collector 20 may be formed of an electrically conductive material, such as aluminum or another metal that can function as the positive terminal of the lithium ion battery 10.

The porous polymer separator 16 of the lithium ion battery 10 operates as an electrical insulator (preventing the occurrence of a short), a mechanical support, and a barrier to prevent physical contact between the two electrodes 12, 14. The porous polymer separator 16 also ensures passage of lithium ions (not shown) through an electrolyte (not shown) filling its pores.

The porous polymer separator 16 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous polymer separators 16 include single layer polypropylene membranes, such as CELGARD 2400 and CELGARD 2500 from Celgard, LLC (Charlotte, N.C.). It is to be understood that the porous polymer separator 16 may be coated or treated, or uncoated or untreated. For example, the porous polymer separator 16 may or may not be coated or include any surfactant treatment or ceramic particles thereon.

In other examples, the porous polymer separator 16 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Mississippi)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous polymer separator 16 is poly(p-hydroxybenzoic acid). In yet another example, the porous polymer separator 16 may be chosen from a combination of the polyolefin (such as PE and/or PP) and one or more of the other polymers listed above.

The porous polymer separator 16 may be a single layer or may be a multi-layer (e.g., bilayer, trilayer, etc.) laminate fabricated from either a dry or wet process.

The electrolyte of the lithium ion battery 10 may be a liquid, gel, or polymer electrolyte. In an example, the electrolyte includes an organic solvent and a lithium salt dissolved in the organic solvent. Examples of the organic solvent include cyclic carbonates (ethylene carbonate (EC), propylene carbonate, butylene carbonate, fluoroethylene carbonate), linear carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof. For example, the electrolyte may be a mixture of ethylene carbonate, dimethyl carbonate, and diethyl carbonate. Examples of the lithium salt include LiClO$_4$, LiAlCl$_4$, LiI, LiBr, LiSCN, LiBF$_4$, LiB(C$_6$H$_5$)$_4$, LiAsF$_6$, LiCF$_3$SO$_3$, LiN(FSO$_2$)$_2$ (LIFSI), LiN(CF$_3$SO$_2$)$_2$(LITFSI), LiPF$_6$, LiB(C$_2$O$_4$)$_2$ (LiBOB), LiBF$_2$(C$_2$O$_4$) (LiODFB), LiPF$_3$(C$_2$F$_5$)$_3$ (LiFAP), LiPF$_4$(CF$_3$)$_2$, LiPF$_4$(C$_2$O$_4$) (LiFOP), LiNO$_3$, LiPF$_3$(CF$_3$)$_3$, LiSO$_3$CF$_3$, and mixtures thereof. The concentration of the salt in the electrolyte may be about 1 mol/L. LiNO$_3$ may also be added to the electrolyte as an additive. In these instances, the concentration of the lithium salt may be about 0.6 mol/L plus the LiNO$_3$ additive. Any suitable polymer electrode may be used, examples of which include poly(ethylene oxide) (PEO) or PEO-PS (polystyrene) block co-polymers.

While not shown in FIG. 1, the fully assembled lithium ion battery 10 may also include an external circuit that connects the current collectors 18, 20. Also while not shown, it is to be understood that the fully assembled lithium ion battery 10 may be disposed in a casing (e.g., metal or a pouch).

Together FIGS. 1 and 2 illustrate the lithium ion battery 10 after assembly (FIG. 1) and after a first charging operation (FIG. 2). In each of the figures, the Li ions are represented by the shading of the components having Li ions therein/thereon. Li ions in the fully-assembled battery 10 are in/on the lithium donor 24 and the cathode 14, as shown in FIG. 1.

Once the battery 10 is assembled, the battery 10 is charged in a charging operation by an outside source of power. FIG. 2 shows the battery 10 in a fully-charged state with a solid electrolyte interphase (SEI) 28 formed between the negative electrode 12 and the porous polymer separator 16. As represented by the shading in FIG. 2, the SEI 28, the lithium donor 24, and the negative electrode 12 have Li ions therein/thereon.

When the battery 10 is charged for the first time, Li ions are extracted from the positive electrode 14 and introduced into the negative electrode 12. As a result, the decomposition product, referred to as the SEI 28, forms on the surface of the negative electrode 12. The SEI 28 includes lithium ions and electrolyte components. The SEI 28 establishes an ionic connection between the negative electrode 12 and the electrolyte, and thus SEI 28 formation is desirable. However, as the SEI 28 is formed, a portion of the lithium ions introduced into the cell via the positive electrode 14 is irreversibly bound to the SEI 28 and no longer participates in the cyclic operation of the battery 10. In the example battery 10 disclosed herein, the lithium donor 24 provides the additional lithium ions to compensate for lithium ions lost to the SEI 28, in addition to providing enough lithium ions to intercalate into the positive electrode 14 during a subsequent discharging operation of the battery 10. For example, during discharging, the lithium donor $Li_7MnP_4$ can undergo an electrochemical reaction to form $6Li^+$ and $LiMnP_4$ (the latter of which can be re-lithiated during a subsequent charge cycle).

The lithium donor 24 pre-lithiates the negative electrode 12 in this example. As such, irreversible capacity loss of the battery 10 is minimized and capacity retention thereof is maximized. Accordingly, the Coulombic efficiency of the battery 10 is also maximized. Additionally, the use of the lithium donor 24 material disclosed herein for pre-lithiation instead of pure lithium or lithium foil reduces or prevents undesirable formation of lithium dendrites during operation of the battery 10, thereby improving the abuse tolerance of the battery 10. If the battery 10 were used in a vehicle (not shown), the battery 10 may also have increased energy density, which will extend a driving range of the vehicle. Furthermore, by including the lithium donor 24 on the negative electrode 12 side of the battery 10, packing extra lithium capacity in the positive electrode 14, as known in the art, is not required, and lithium plating of components, such as the negative electrode 12, is reduced or eliminated.

While not shown, it is to be understood that during the discharge cycle of the lithium ion battery 10, the lithium ions migrate from the negative electrode 12, across the porous polymer separator 16, and to the positive electrode 14. With the exception of the formation of the SEI 28, a subsequent charge cycle of the battery 10 is similar to the first cycle described herein. The subsequent charge cycle re-lithiates the negative electrode 12. As an example, during charging, the $LiMnP_4$ (an example of the lithium donor 24 after discharge) may be re-lithiated (at least in early life cycles) to form $Li_7MnP_4$ or other more lithiated compounds, such as $Li_{10}MnP_4$, depending upon the number of excess lithium ions present.

Referring now to FIG. 3, another example of the lithium ion battery 10' including other examples of the lithium ion battery component 11', 11" is shown. The lithium ion battery component 11', 11" includes a support 13 and a coating 32 formed on at least a portion of surface of the support 13. In the lithium ion battery component 11", the support 13 is the negative electrode 12', and the surface 29 has the coating 32 formed thereon. In the lithium ion battery component 11', the support 13 is the porous polymer separator 16, and the surface 30 has the coating 32 formed thereon.

The negative electrode 12' may include the non-lithium active material 22 alone or in combination with the binder and/or conductive filler and/or other additives. In an example, the negative electrode 12' does not include the lithium donor 24, in part because the lithium donor 24 is present in the coating 32 formed either on the surface 29 or the surface 30. Any example of the porous polymer separator 16 previously described may be used.

In this example, the coating 32 is made up of the lithium donor 24. In an example, 100% of the coating 32 is formed of the lithium donor 24. In another example, additives (such as the previously listed binders) may be included in the coating 32. In these instances, the lithium donor 24 makes up less than 100% (e.g., as low as 80 wt %) of the coating 32.

Prior to assembly of the lithium ion battery 10', the coating 32 may be formed according to an example of the method disclosed herein.

The lithium ion battery component 11' may be formed by mixing the lithium donor 24 in a powdered form with a non-aqueous liquid to form a slurry. As previously described, the non-aqueous liquid may be NMP (N-Methyl-2-pyrrolidone), acetone, or the like. In this example of the method, the slurry material is coated (e.g., doctor blade coated, slot die coated, etc.) on all or a portion of one side 30 of the support 13/porous polymer separator 16, and is dried to form the coating 32 thereon.

The lithium ion battery component 11" may be formed by mixing the lithium donor 24 in a powdered form with a non-aqueous liquid to form a slurry. Any of the previously described examples of the non-aqueous liquid may be used. In this example of the method, the slurry material is coated (e.g., doctor blade coated, slot die coated, etc.) on all or a portion of one side 29 of the support 13/negative electrode 12', and is dried to form the coating 32 thereon.

The thickness of the coating 32 may depend, in part, on the thickness of the slurry that is coated. The coating 32 may be slightly thinner than the coated slurry due to the removal of the non-aqueous liquid during drying. The thickness of the coating 32 may range from about 1 nm to about 20 μm. In an example, the thickness of the coating 32 is about 5 nm.

Once the lithium donor coating 32 is formed, the battery 10' is fully assembled, for example, in a casing (not shown). When the coating 32 is formed on the surface 30 of the separator 16, the lithium ion battery component 11' may be positioned in the battery 10' so that the coating 32 faces the negative electrode 12'. When the coating 32 is formed on the surface 29 of the negative electrode 12', the lithium ion battery component 11" may be positioned in the battery 10' so that the coating 32 faces the separator 16. As such, the fully-assembled battery 10' includes, in series, the negative-side current collector 18, the negative electrode 12', the coating 32, the porous polymer separator 16, the positive electrode 14, and the positive-side current collector 20, as shown in FIG. 3. Each of the electrodes 12' 14, the coating 32, and the porous polymer separator 16 may be soaked in a suitable electrolyte.

The negative-side current collector 18, the positive electrode 14, the positive-side current collector 20, and the electrolyte may be any of the examples previously described.

When the fully-assembled battery 10' is charged for the first time, lithium ions are extracted from the positive electrode 14 and introduced into the negative electrode 12'. The decomposition product, referred to as the SEI 28 (not shown in FIG. 3), may form on all or a portion of the surface of the coating 32 (e.g., between the coating 32 and the porous polymer separator 16) and/or on all or a portion of the surface of the negative electrode 12' (e.g., between the negative electrode 12' and the coating 32). The SEI 28 establishes an ionic connection between the negative electrode 12' (in some instances, through the coating 32) and an electrolyte of the battery 10'. The lithium donor 24 in the coating 32 provides additional lithium ions to compensate for lithium lost to the SEI 28, in addition to providing enough lithium ions to intercalate into the positive electrode 14 during a discharging operation of the battery 10'.

While not shown, it is to be understood that during the discharge cycle of the lithium ion battery 10', the lithium ions migrate from the negative electrode 12', or the negative electrode 12' and the coating 32, across the porous polymer separator 16, and finally to the positive electrode 14. With the exception of the formation of the SEI 28, a subsequent charge cycle of the battery 10' is similar to the first cycle described herein.

By providing the lithium donor 24 in the form of a coating 32 formed on the negative electrode 12' or the porous polymer separator 16, irreversible capacity loss of the battery 10' is minimized and capacity retention thereof is maximized. In turn, the Coulombic efficiency of the battery 10' is also maximized. The pre-lithiation by the lithium donor 24 disclosed herein can also reduce or prevent an undesirable formation of lithium dendrites during operation of the battery 10', thereby improving the abuse tolerance of the battery 10'. If the battery 10' is used in a vehicle, the battery 10' may have increased energy density, which will extend a driving range of the vehicle. Furthermore, by including the lithium donor 24 on the side 30 of the separator 16 that faces the negative electrode 12' or the side 29 of the negative electrode 12' that faces the separator 16, there is no need to pack extra lithium capacity on the positive electrode 14 side of the battery 10'.

It is to be further understood that another example includes a combination of the features of the example shown in FIGS. 1 and 2 and the example shown in FIG. 3. For example, the lithium ion battery may include the lithium ion battery component 11 (i.e., the negative-side current collector 18 and the electrode 12, which include the lithium donor 24 therein), the lithium ion battery component 11' (i.e., the porous polymer separator 16 and the coating 32, the positive electrode 14, and the positive-side current collector 20. For another example, the lithium ion battery may include the lithium ion battery component 11 (i.e., the negative-side current collector 18 and the electrode 12, which includes the lithium donor 24 therein), the lithium ion battery component 11" (i.e., the negative electrode 12 and the coating 32 formed thereon), the separator 16, the positive electrode 14, and the positive-side current collector 20.

It is to be understood that the ranges provided herein include the stated range and any value or sub-range within the stated range. For example, a range of from greater than 0 wt % to about 50 wt % should be interpreted to include not only the explicitly recited limits of from greater than 0 wt % to about 50 wt %, but also to include individual values, such as 0.75 wt %, 15 wt %, 32 wt %, 49.5 wt %, etc., and sub-ranges, such as from about 0.25 wt % to about 35 wt %; from about 2 wt % to about 25 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A lithium ion battery component, comprising:
   a support selected from the group consisting of a current collector, a negative electrode, and a porous polymer separator; and
   a lithium donor present i) as an additive mixed with a non-lithium active material in the negative electrode which is formed on the current collector, or ii) as a coating on at least a portion of the negative electrode, or iii) as a coating on at least a portion of the porous polymer separator, the lithium donor having a formula selected from the group consisting of $Li_{8-y}Fe_yP_4$, wherein y ranges from 1 to 4 and $Li_{10-y}Ti_yP_4$, wherein y ranges from 1 to 2.

2. The lithium ion battery component as defined in claim 1 wherein:
   the lithium donor is present as the additive mixed with the non-lithium active material in the negative electrode which is formed on the current collector;
   the non-lithium active material is present in an amount ranging from greater than 0 wt % to about 98 wt % of a total wt % of the negative electrode; and
   the lithium donor is present in an amount ranging from greater than 0 wt % to about 50 wt % of a total wt % of the negative electrode.

3. The lithium ion battery component as defined in claim 2 wherein the non-lithium active material is selected from the group consisting of i) a carbon-based material; ii) silicon (Si), germanium (Ge), tin (Sn), lead (Pb), antimony (Sb), bismuth (Bi), zinc (Zn), aluminum (Al), or cadmium (Cd); iii) alloys or intermetallic compounds of Si, Ge, Sn, Pb, Sb, Bi, Zn, Al, Ti, iron (Fe), manganese (Mn), or Cd with other elements; iv) oxides, carbides, nitrides, sulfides, phosphides, selenides, or tellurides of Si, Ge, Sn, Pb, Sb, Bi, Zn, Al, Fe, Ti, Mn, Co, or Cd; and v) any combination of i, ii, iii, and iv.

4. The lithium ion battery component as defined in claim 1 wherein the lithium donor is $Li_9TiP_4$.

5. The lithium ion battery component as defined in claim 1 wherein the lithium donor is present as the coating on the portion of the porous polymer separator.

6. A lithium ion battery, comprising:
   a positive electrode;
   a negative electrode;
   a porous polymer separator positioned between the positive electrode and the negative electrode; and
   a lithium donor present in the negative electrode as an additive with a non-lithium active material, or present as a coating on at least a portion of the negative electrode, or present as a coating on at least a portion of a surface of the porous polymer separator that faces the negative electrode, the lithium donor being selected from the group consisting of $Li_{8-y}Fe_yP_4$, wherein y ranges from 1 to 4 and $Li_{10-y}Ti_yP_4$, wherein y ranges from 1 to 2.

7. The lithium ion battery as defined in claim 6 wherein:
the lithium donor is present in the negative electrode as the additive with the non-lithium active material;
the non-lithium active material is present in an amount ranging from greater than 0 wt % to about 98 wt % of a total wt % of the negative electrode; and
the lithium donor is present in an amount ranging from greater than 0 wt % to about 50 wt % of a total wt % of the negative electrode.

8. The lithium ion battery as defined in claim 7 wherein the non-lithium active material is selected from the group consisting of i) a carbon-based material; ii) silicon (Si), germanium (Ge), tin (Sn), lead (Pb), antimony (Sb), bismuth (Bi), zinc (Zn), aluminum (Al), or cadmium (Cd); iii) alloys or intermetallic compounds of Si, Ge, Sn, Pb, Sb, Bi, Zn, Al, Ti, iron (Fe), manganese (Mn), or Cd with other elements; iv) oxides, carbides, nitrides, sulfides, phosphides, selenides, or tellurides of Si, Ge, Sn, Pb, Sb, Bi, Zn, Al, Fe, Ti, Mn, Co, or Cd; and v) any combination of i, ii, iii, and iv.

9. The lithium ion battery as defined in claim 6 wherein the lithium donor is $Li_9TiP_4$.

10. The lithium ion battery as defined in claim 6 wherein the lithium donor is present as the coating on the portion of the surface of the porous polymer separator that faces the negative electrode.

11. The lithium ion battery as defined in claim 6 wherein the lithium donor is in a form of particles having a particle size ranging from about 10 nm to about 50 microns.

12. A method for forming a lithium ion battery component, the method comprising:
mixing a powdered lithium donor with an non-aqueous liquid to form a slurry, the lithium donor selected from the group consisting of $Li_{8-y}Fe_yP_4$, wherein y ranges from 1 to 4 and $Li_{10-y}Ti_yP_4$, wherein y ranges from 1 to 2;
coating the slurry on a support selected from the group consisting of a current collector, a negative electrode, and a porous polymer separator; and
drying the slurry.

13. The method as defined in claim 12 wherein the slurry is coated on the current collector, and wherein prior to the mixing of the powdered lithium donor with the non-aqueous liquid, the method further comprises mixing the powdered lithium donor with a powdered non-lithium active material to form a powder mixture.

14. The method as defined in claim 13 wherein:
the non-lithium active material is present in an amount ranging from greater than 0 wt % to about 98 wt % of a total wt % of the powder mixture; and
the lithium donor is present in an amount ranging from greater than 0 wt % to about 50 wt % of a total wt % of the powder mixture.

* * * * *